(12) United States Patent
Kenney et al.

(10) Patent No.: US 11,499,790 B2
(45) Date of Patent: Nov. 15, 2022

(54) HEAT EXCHANGER WITH MULTIPASS FLUID FLOW PASSAGES

(71) Applicant: Dana Canada Corporation, Oakville (CA)

(72) Inventors: Benjamin A. Kenney, Oakville (CA); Lee M. Kinder, Oakville (CA); Kwok Wai Chan, Oakville (CA)

(73) Assignee: Dana Canada Corporation, Oakville (CA)

(*) Notice: Subject to any disclaimer, the term of this patent is extended or adjusted under 35 U.S.C. 154(b) by 195 days.

(21) Appl. No.: 16/750,177

(22) Filed: Jan. 23, 2020

(65) Prior Publication Data

US 2020/0240721 A1 Jul. 30, 2020

Related U.S. Application Data

(60) Provisional application No. 62/798,851, filed on Jan. 30, 2019.

(51) Int. Cl.
*F28F 3/08* (2006.01)
*F28F 3/14* (2006.01)
(Continued)

(52) U.S. Cl.
CPC ......... *F28F 3/086* (2013.01); *B60H 1/00278* (2013.01); *B60L 50/50* (2019.02); *B60L 58/26* (2019.02); *B60L 58/27* (2019.02); *F28D 1/0308* (2013.01); *F28D 1/0341* (2013.01); *F28D 1/0358* (2013.01); *F28D 9/0025* (2013.01); *F28D 9/02* (2013.01); *F28F 3/10* (2013.01); *F28F 3/12* (2013.01); *F28F 3/14* (2013.01); *F28F 9/0221* (2013.01); *H01M 10/60* (2015.04); *H01M 10/613* (2015.04); *H01M 10/625* (2015.04); *H01M 10/6556* (2015.04);
(Continued)

(58) Field of Classification Search
CPC .... F28D 1/0308; F28D 1/0358; F28D 9/0025; F28D 9/02; F28D 1/0341; F28D 9/0221; F28D 1/035; F28D 1/0366; F28D 1/0383; F28F 3/086; F28F 3/10; F28F 3/12; F28F 3/14; F28F 9/0221; H01M 10/60; H01M 10/625; H01M 10/6556; H01M 10/613; H01M 10/6567; H01M 10/6568; B60H 1/00278; B60L 50/50; B60L 50/60; B60L 58/26; B60L 58/27
See application file for complete search history.

(56) References Cited

U.S. PATENT DOCUMENTS 6,479,185 B1 * 11/2002 Hilderbrand ...... H01M 10/6565
429/62
8,623,538 B2 * 1/2014 Wang .................. C09K 5/06
429/120
(Continued)

*Primary Examiner* — Jenna M Hopkins
(74) *Attorney, Agent, or Firm* — McCoy Russell LLP

(57) ABSTRACT

Methods and systems are provided for a heat exchanger. In one example, the heat exchanger may dissipate energy generated by a battery module and may include a first plate and a second plate arranged in opposed facing relation to one another. A plurality of flow passages may be formed between the first and second plates, the plurality of flow passages including at least one multipass fluid flow passage with at least three longitudinally-extending legs.

8 Claims, 10 Drawing Sheets
(1 of 10 Drawing Sheet(s) Filed in Color)

(51) Int. Cl.

| | | |
|---|---|---|
| *F28F 3/10* | (2006.01) | |
| *B60H 1/00* | (2006.01) | |
| *F28F 9/02* | (2006.01) | |
| *F28D 1/03* | (2006.01) | |
| *H01M 10/6567* | (2014.01) | |
| *B60L 58/27* | (2019.01) | |
| *F28F 3/12* | (2006.01) | |
| *H01M 10/6556* | (2014.01) | |
| *H01M 10/613* | (2014.01) | |
| *F28D 9/00* | (2006.01) | |
| *B60L 58/26* | (2019.01) | |
| *H01M 10/625* | (2014.01) | |
| *H01M 10/6568* | (2014.01) | |
| *B60L 50/50* | (2019.01) | |
| *F28D 9/02* | (2006.01) | |
| *H01M 10/60* | (2014.01) | |
| *B60L 50/60* | (2019.01) | |

(52) U.S. Cl.
CPC ... *H01M 10/6567* (2015.04); *H01M 10/6568* (2015.04); *B60L 50/60* (2019.02)

(56) References Cited

U.S. PATENT DOCUMENTS

| | | | | |
|---|---|---|---|---|
| 8,790,808 | B2* | 7/2014 | Herrmann | F28D 7/0066 |
| | | | | 429/120 |
| 8,797,741 | B2* | 8/2014 | Altman | H01L 23/427 |
| | | | | 361/702 |
| 8,835,038 | B2* | 9/2014 | Abels | F28F 3/044 |
| | | | | 429/120 |
| 8,835,039 | B2* | 9/2014 | Teng | H01M 10/625 |
| | | | | 429/120 |
| 9,291,405 | B2* | 3/2016 | Pentapati | F28F 3/12 |
| 9,318,782 | B2* | 4/2016 | Hirsch | H01M 10/6556 |
| 9,373,873 | B2* | 6/2016 | Lev | H01M 10/625 |
| 9,620,829 | B2* | 4/2017 | Haussmann | F28F 9/02 |
| 9,711,829 | B2* | 7/2017 | Haussmann | F28F 3/12 |
| 9,755,283 | B2* | 9/2017 | Hirsch | B60L 58/26 |
| 10,006,722 | B2* | 6/2018 | Kenney | H01M 10/613 |
| 10,158,151 | B2* | 12/2018 | Kenney | F28F 3/00 |
| 10,263,301 | B2* | 4/2019 | Kenney | B23P 15/26 |
| 10,355,331 | B2* | 7/2019 | Kenney | H01M 10/6568 |
| 10,601,093 | B2* | 3/2020 | Vanderwees | H01M 10/6557 |
| 10,608,305 | B2* | 3/2020 | Burgers | F28F 9/0248 |
| 10,634,431 | B2* | 4/2020 | Shiozawa | F28D 7/16 |
| 10,668,832 | B2* | 6/2020 | Capati | B60L 58/26 |
| 10,794,638 | B2* | 10/2020 | Vucenic | F28F 3/044 |
| 10,910,683 | B2* | 2/2021 | Myers | B29C 65/606 |
| 2015/0086831 | A1* | 3/2015 | Haussmann | H01M 10/6556 |
| | | | | 429/120 |
| 2016/0036104 | A1* | 2/2016 | Kenney | H01M 10/6557 |
| | | | | 429/120 |
| 2016/0049705 | A1* | 2/2016 | Mahe | F28F 3/12 |
| | | | | 429/120 |
| 2016/0097598 | A1* | 4/2016 | Hirsch | F24D 19/067 |
| | | | | 165/175 |
| 2016/0204486 | A1* | 7/2016 | Kenney | H01M 10/6556 |
| | | | | 429/120 |
| 2016/0238323 | A1* | 8/2016 | Jones | F28D 1/0375 |
| 2016/0315365 | A1* | 10/2016 | Vanderwees | H01M 10/6557 |
| 2016/0359211 | A1* | 12/2016 | Kenney | H01M 10/613 |
| 2017/0194679 | A1* | 7/2017 | Chakraborty | F28F 3/12 |
| 2018/0248238 | A1* | 8/2018 | Pinon | H01M 10/6556 |
| 2018/0337434 | A1* | 11/2018 | Burgers | H01M 10/613 |
| 2019/0109357 | A1* | 4/2019 | Kenney | H01M 10/6554 |
| 2020/0161721 | A1* | 5/2020 | Wang | H01M 10/6567 |
| 2020/0227794 | A1* | 7/2020 | Mazza | H01M 10/6554 |
| 2020/0240721 | A1* | 7/2020 | Kenney | H01M 10/625 |
| 2021/0242516 | A1* | 8/2021 | Rahim | F28F 3/12 |
| 2021/0247145 | A1* | 8/2021 | Vakilimoghaddam | F28D 1/0341 |

\* cited by examiner

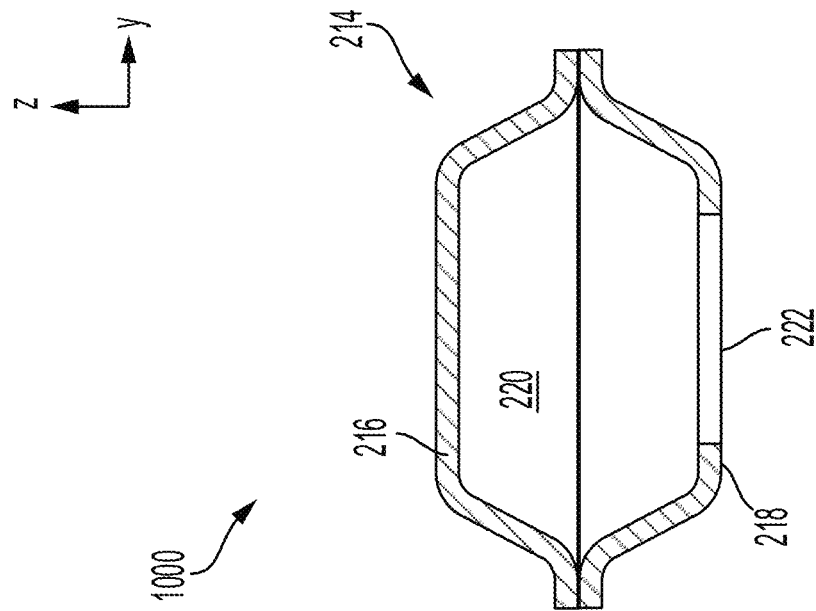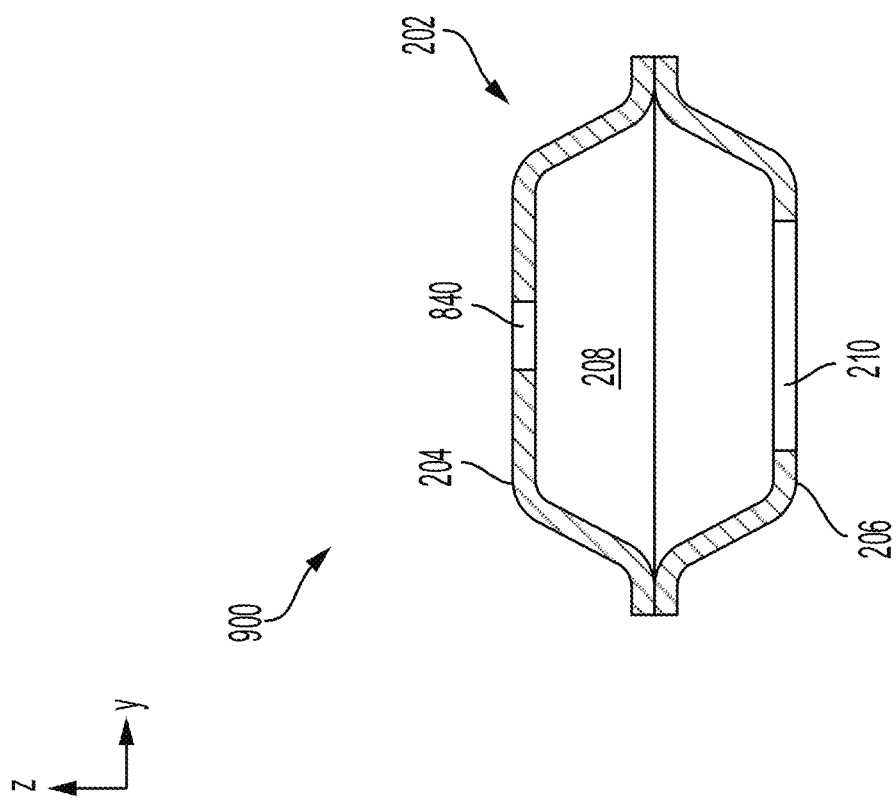

HEAT EXCHANGER WITH MULTIPASS FLUID FLOW PASSAGES

CROSS-REFERENCE TO RELATED APPLICATIONS

The present application claims priority to U.S. Provisional Application No. 62/798,851, entitled "Heat Exchanger with Multipass Fluid Flow Passages", filed on Jan. 30, 2019. The entire contents of the above-listed application are hereby incorporated by reference for all purposes.

TECHNICAL FIELD

The present disclosure relates to thermal management of rechargeable batteries within an energy storage system of a battery electric vehicle (BEV) or hybrid electric vehicle (HEV), and particularly to heat exchangers adapted for cooling rechargeable batteries.

BACKGROUND AND SUMMARY

Energy storage systems such as those used in BEVs and HEVs comprise rechargeable lithium-ion batteries. A typical rechargeable battery for a BEV or HEV will comprise a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells.

Rechargeable vehicle batteries in BEVs and HEVs generate large amounts of heat that needs to be dissipated, therefore these types of batteries or battery systems need to be cooled to extend their service life.

Liquid cooled heat exchangers can be used to manage the thermal load of these rechargeable vehicle batteries. These battery heat exchangers typically comprise "cold plate" heat exchangers or "ICE" ("inter-cell elements") plate heat exchangers. A cold plate heat exchanger is a heat exchanger having a flat upper surface upon which one or more battery cells is arranged, wherein the number of battery cells associated with each cold plate is variable and may, depending on the area of the cold plate, comprise one or more battery modules. Typically, the battery cells arranged on the cold plate will be prismatic cells or cylindrical cells, which are housed in rigid containers. For example, prismatic cells may be housed in box-like containers which are arranged in face-to-face contact with each other.

In contrast, ICE plate heat exchangers are arranged or "sandwiched" between the adjacent pouch cells or prismatic cells, the individual ICE plate heat exchangers being fluidically connected together by common inlet and outlet manifolds. Examples of cold plate heat exchangers and ICE plate heat exchangers are described in commonly assigned U.S. patent application Ser. No. 14/972,463 entitled COUNTER-FLOW HEAT EXCHANGER FOR BATTERY THERMAL MANAGEMENT APPLICATIONS (Publication No. US 2016/0204486 A1), which is incorporated herein by reference in its entirety.

Temperature uniformity across the surface of battery heat exchangers is an important consideration in the thermal management of these types of battery units or overall battery systems as temperature uniformity across the surface of the heat exchanger relates to ensuring that there is a minimum temperature differential within the individual battery cells and between adjacent battery cells of the vehicle battery. Ensuring adequate temperature uniformity is a challenging aspect of heat exchanger design since the temperature of the heat transfer fluid is higher at the outlet than at the inlet.

A number of heat exchanger configurations are known where the inlet and outlet are located at the same end of the cold plate and where the fluid flow passages have a U-flow or counterflow arrangement. There is a need to achieve improved temperature uniformity in other cold plate configurations, for example where the inlet and outlet fittings are located at opposite ends of the cold plate.

In accordance with an aspect of the present disclosure, there is provided a heat exchanger having a first end and a second end spaced apart along a longitudinal axis and a first side edge and a second side edge extending between the first and second ends.

The heat exchanger comprises a first plate having an inner surface, an outer surface, a pair of opposed, longitudinally-extending first and second side edges and a pair of opposed, transversely-extending first and second end edges.

The heat exchanger further comprises a second plate having an inner surface, an outer surface, a pair of opposed, longitudinally-extending first and second side edges and a pair of opposed, transversely-extending first and second end edges. The first and second plates are joined together with their inner surfaces in opposed facing relation to one another, and with portions of the inner surfaces being spaced apart from one another.

The heat exchanger further comprises a plurality of fluid flow passages adapted for flow of a heat transfer fluid, and located between the spaced apart portions of the inner surfaces of the first and second plates.

The heat exchanger further comprises an inlet port at the first end of the heat exchanger for supplying the heat transfer fluid to the plurality of fluid flow passages; and an outlet port at the second end of the heat exchanger for discharging the heat transfer fluid from the plurality of fluid flow passages.

The plurality of fluid flow passages of the heat exchanger comprises at least one multipass fluid flow passage having an open inlet end in flow communication with the inlet port, and an open outlet end in flow communication with the outlet port. Each multipass fluid flow passage has at least three longitudinally-extending legs.

According to an aspect, the at least three longitudinally-extending legs of each multipass fluid flow passage extend longitudinally and are parallel to each other.

According to an aspect, the at least three longitudinally-extending legs of each multipass fluid flow passage comprise: an inlet leg which includes the inlet end of the multipass fluid flow passage; an outlet leg which includes the outlet end of the multipass fluid flow passage; and at least one intermediate leg located between the inlet leg and the outlet leg.

According to an aspect, each of the at least one multipass fluid flow passages includes one intermediate leg which is located adjacent to each of the inlet leg and the outlet leg.

According to an aspect, the inlet leg of one multipass fluid flow passage extends along the first side edge of the second plate.

According to an aspect, the at least one multipass fluid flow passage comprises a plurality of multipass fluid flow passages, with a first multipass fluid flow passage adjacent to a second multipass fluid flow passage, with the outlet leg of the first multipass fluid flow passage adjacent to the inlet leg of the second multipass fluid flow passage.

According to an aspect, the plurality of fluid flow passages further comprises a single-pass fluid flow passage extending along the second side edge of the second plate, wherein the single-pass fluid flow passage has an open inlet end in flow communication with the inlet port, and an open outlet end in flow communication with the outlet port.

According to an aspect, the plurality of fluid flow passages further comprises a single-pass fluid flow passage extending along the second side edge of the second plate, wherein the single-pass fluid flow passage has an open inlet end in flow communication with the inlet port, and an open outlet end in flow communication with the outlet port. The single-pass fluid flow passage may be located between, and parallel to, the second side edge of the second plate and the outlet leg of one multipass fluid flow passage.

According to an aspect, the heat exchanger further comprises an internal inlet manifold space proximate to the first end of the heat exchanger, wherein the inlet manifold space is in flow communication with the inlet port and with each fluid flow passage of the plurality of fluid flow passages; and an internal outlet manifold space proximate to the second end portion of the heat exchanger, wherein the outlet manifold space is in flow communication with the outlet port and with each fluid flow passage of the plurality of fluid flow passages. The inlet and outlet manifold spaces may be located between the spaced apart portions of the inner surfaces of the first and second plates.

According to an aspect, the inlet manifold space is in flow communication with the open inlet end of each multipass fluid flow passage; and the outlet manifold space is in flow communication with the open outlet end of each multipass fluid flow passage.

According to an aspect, the outlet legs and the intermediate legs of the at least one multi-pass fluid flow passages are substantially straight and parallel to each other, and at least generally parallel to the longitudinal axis.

According to an aspect, the inlet leg and the outlet leg of each multipass fluid flow passage is joined to one of intermediate legs by a bend.

According to an aspect, each bend is a rounded, 180-degree hairpin bend which is located proximate to either the first end or the second end of the heat exchanger.

According to an aspect, the inlet port and the outlet port are formed in the first plate; the inlet port is provided with an inlet fitting; and the outlet port is provided with an outlet fitting.

According to an aspect, the first plate is wider than the second plate, such that the first plate includes first and second outwardly projecting side portions extending longitudinally along the first and second side edges of the heat exchanger.

According to an aspect, the heat exchanger further comprises an external inlet manifold having an upper side in which the inlet port is provided, and a lower side which is in direct communication with the open inlet end of each of the fluid flow passages, and which is sealingly joined to the outer surface of the first plate. The heat exchanger further comprises an external outlet manifold having an upper side in which the outlet port is provided, and a lower side which is in direct communication with the open outlet end of each of the fluid flow passages, and which is sealing joined to the outer surface of the first plate.

According to an aspect, the lower side of the external inlet manifold is provided with one or more apertures aligned with a plurality of inlet apertures in the first plate, each of the inlet apertures of the first plate being provided directly over the open inlet end of a fluid flow passage; and the lower side of the external outlet manifold is provided with one or more apertures aligned with a plurality of outlet apertures in the first plate, each of the outlet apertures of the first plate being provided directly over the open outlet end of a fluid flow passage.

According to an aspect, the one or more apertures in the external inlet manifold and/or the external outlet manifold comprise one or more openings, each of which is in flow communication with one or more of the inlet or apertures of the first plate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The patent or application file contains at least one drawing executed in color. Copies of this patent or patent application publication with color drawing(s) will be provided by the Office upon request and payment of the necessary fee.

Exemplary embodiments of the present disclosure will now be described, by way of example, with reference to the accompanying drawings.

FIG. 9 is a first cross-section through an external inlet manifold of the heat exchanger of FIG. 8; and FIG. 10 is a second cross-section through an external outlet manifold of the heat exchanger of FIG. 8.

DETAILED DESCRIPTION

The heat exchangers described herein are generally flat, planar fluid-carrying panels having opposed outer surfaces, at least one of the outer surfaces being adapted for thermal contact with one or more battery cells and/or battery module(s) of a rechargeable battery of a BEV or HEV.

Figure 1:
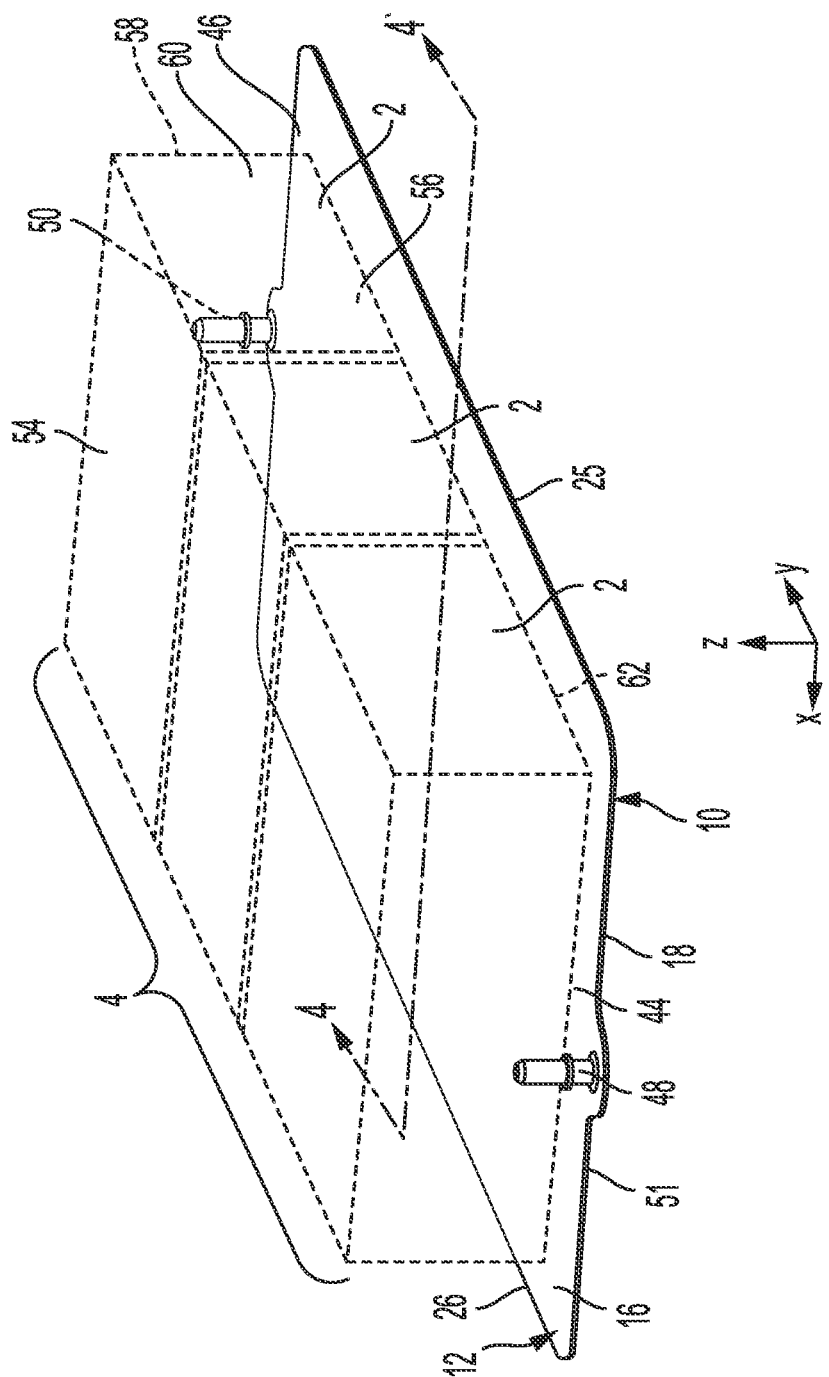
FIG. 1 is a perspective view of a battery heat exchanger with a plurality of battery cells supported on its upper surface.
Figure 4:
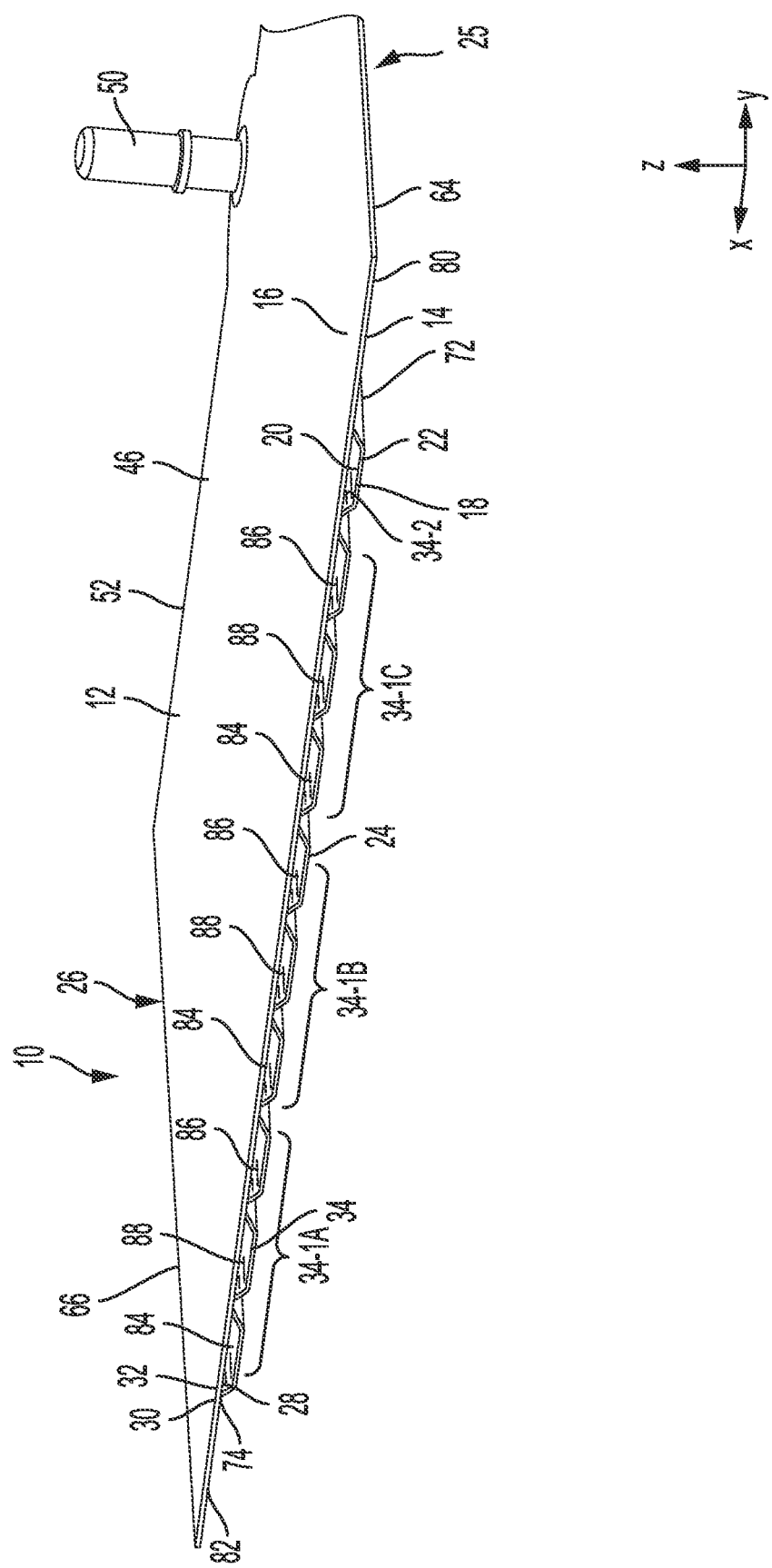
FIG. 4 is a transverse cross-section along line 4-4' of the battery heat exchanger of FIG. 1.
Figure 5:
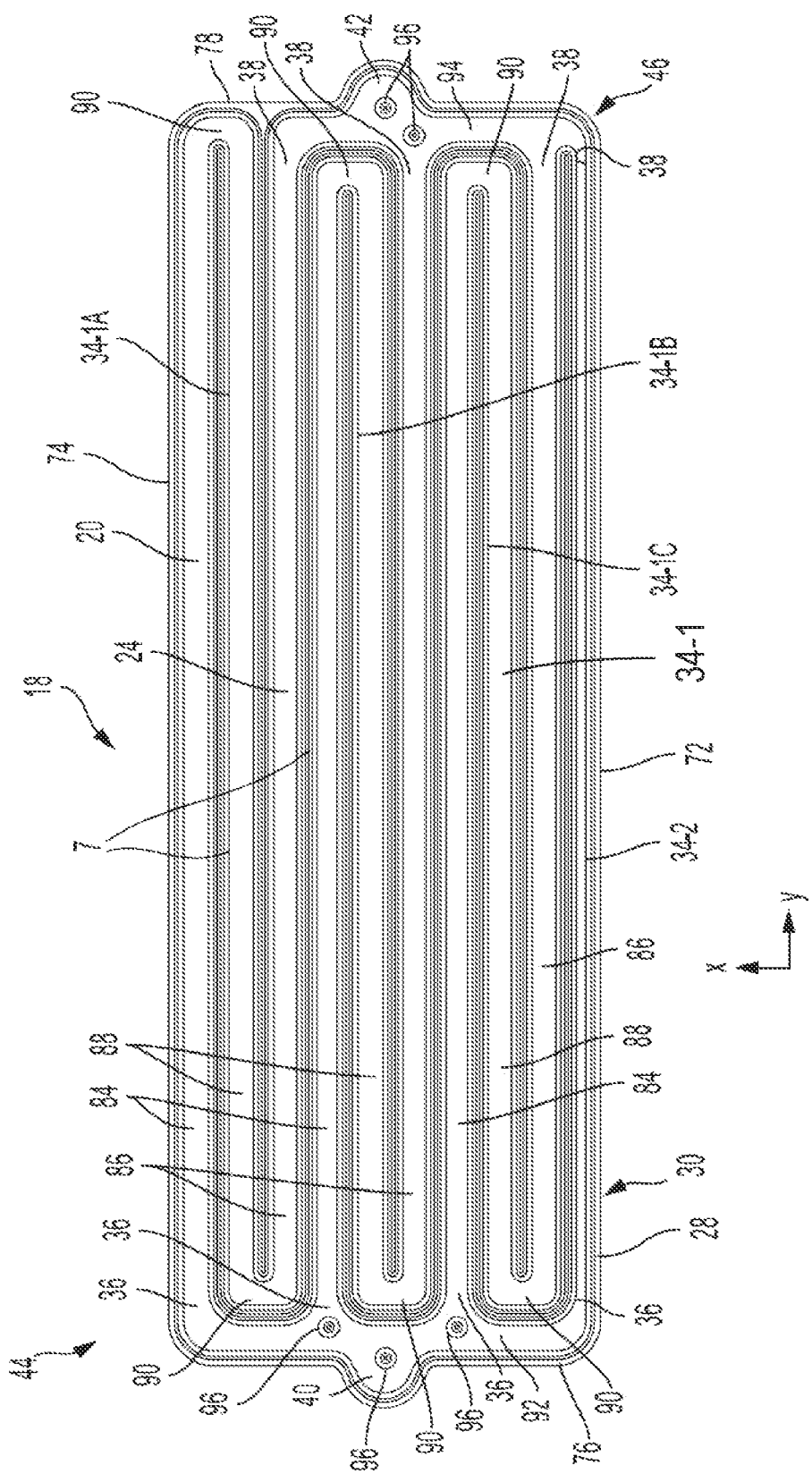
FIG. 5 is a top plan view of the bottom plate of the battery heat exchanger of FIG. 1.
Figure 6:
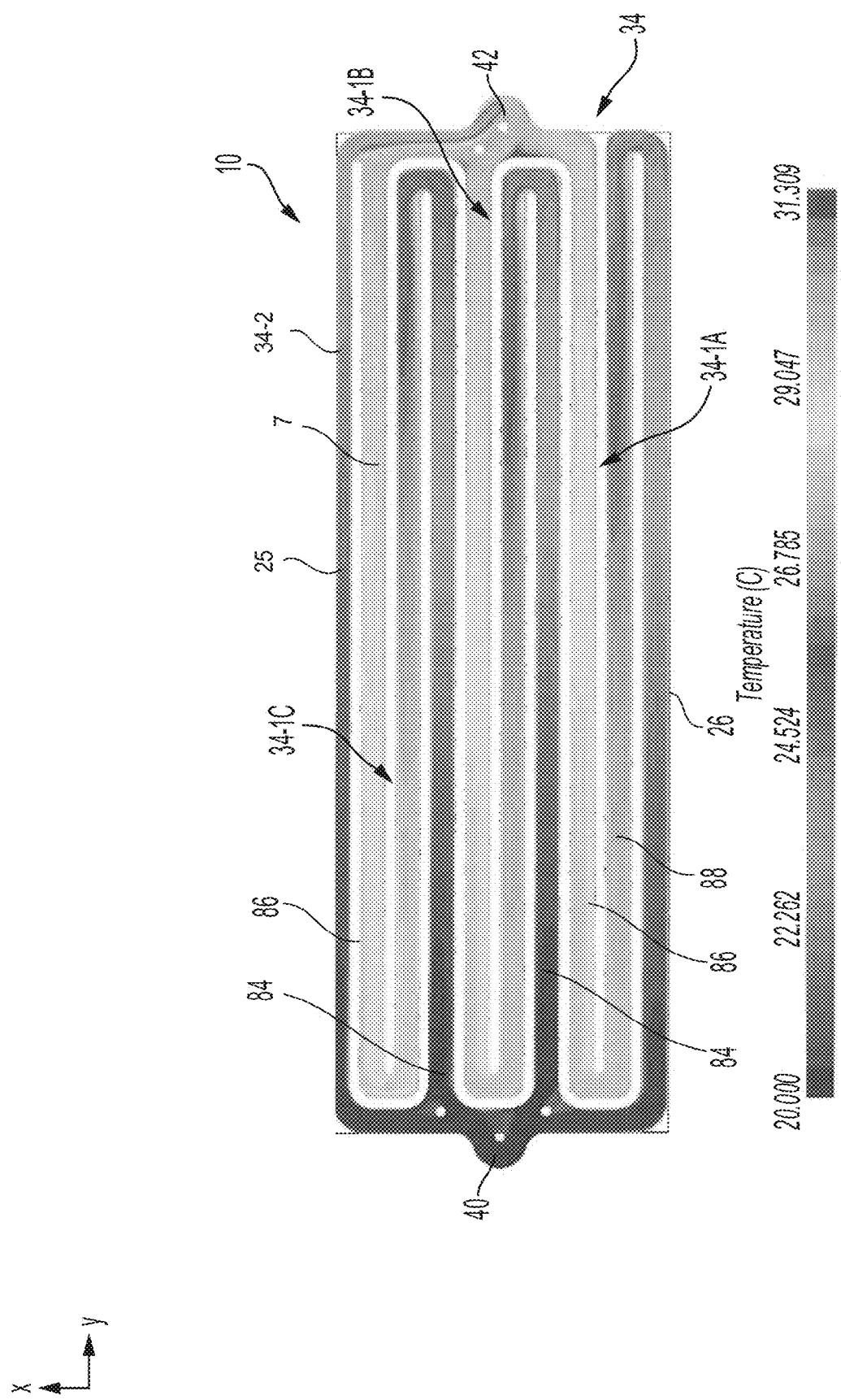
FIG. 6 illustrates a fluid temperature distribution throughout the fluid flow passages of the heat exchanger of FIG. 1.
Figure 7:
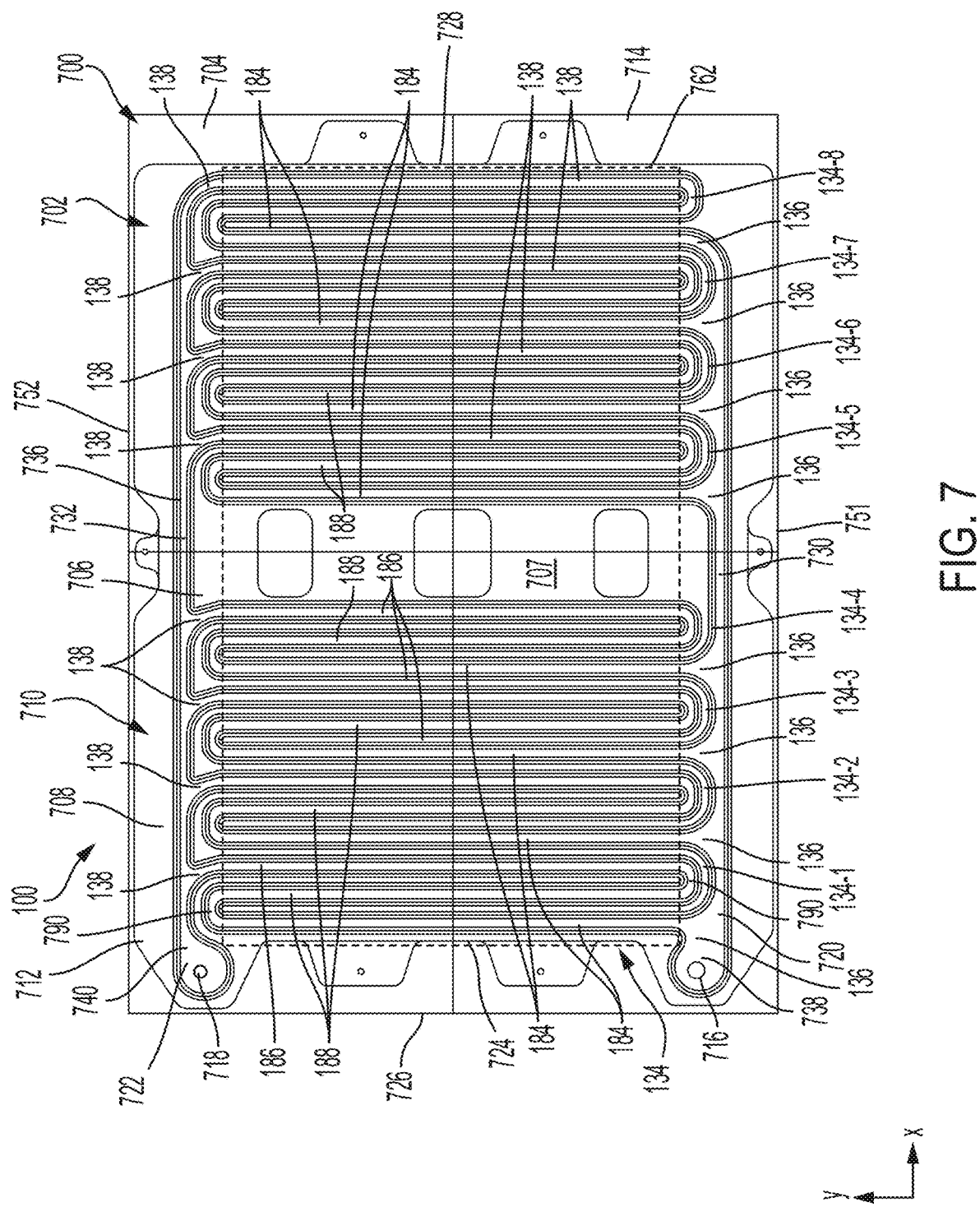
FIG. 7 is a top plan view of a heat exchanger according to a second embodiment, with the first plate shown as being transparent.

An example of a battery heat exchanger configured to increase thermal uniformity across the heat exchanger is shown in FIG. 1, coupled to a battery module. Various views of the battery heat exchanger are depicted in FIGS. 2-5, illustrating an arrangement of fluid flow passages within the battery heat exchanger. A temperature distribution of a heat transfer fluid flowing through the heat exchanger is shown in FIG. 6. A second example of the battery heat exchanger is shown in FIG. 7, the second example illustrating an alternative arrangement of the fluid flow passages and ports. In FIGS. 8-11, a third example of the battery heat exchanger is depicted, including cross-sectional views of external manifold of the heat exchanger.

A heat exchanger 10 according to a first embodiment is now described with reference to FIGS. 1 to 5. Elements shared amongst FIGS. 1-5 are similarly numbered. Heat exchanger 10 comprises a first plate 12 having inner and outer surfaces 14, 16 and a second plate 18 having inner and outer surfaces 20, 22. Heat exchanger 10 is a "cold plate" in which the outer surface 16 of the first plate 12 provides a flat surface upon which one or more battery cells 2 and/or battery modules 4 are supported.

FIG. 1 schematically shows a battery module 4 comprising four prismatic battery cells 2 supported on the outer surface 16 of first plate 12. Each battery cell 2 has a plurality of rectangular surfaces, including a top surface 54, a bottom surface 56, a pair of opposed side surfaces 58, and a pair of opposed end surfaces 60. The bottom surfaces 56 are in thermal contact with the outer surface 16 of first plate 12. Although not shown, the battery cells 2 are electrically connected together, and the battery module 4 is electrically connected to other battery modules of the vehicle battery. Also, the number and arrangement of the battery cells 2 and module(s) 4 supported on the heat exchanger may differ from that shown. For example, the module 4 have include one, two, four, or more battery cells 2 which may be arranged side-by-side, as shown in FIG. 1, or in an array.

A thin layer of thermal interface material (TIM) (not shown) may be provided between the outer surface 16 of first plate 12 and the bottom surfaces 56 of the battery cells 2 to enhance thermal contact between the heat exchanger 10 and battery cells 2. The TIM may be formed from a thermally conductive grease, wax or metallic material, for example.

The heat exchanger 10 is elongated along a longitudinal axis y, having a pair of longitudinally extending first and second side edges 25, 26 and a pair of transversely extending first and second end edges 51, 52 (along transverse axis x). The heat exchanger further comprises first and second end portions 44, 46 extending inwardly of the respective first and second end edges 51, 52, as will be further described below.

Figure 3:
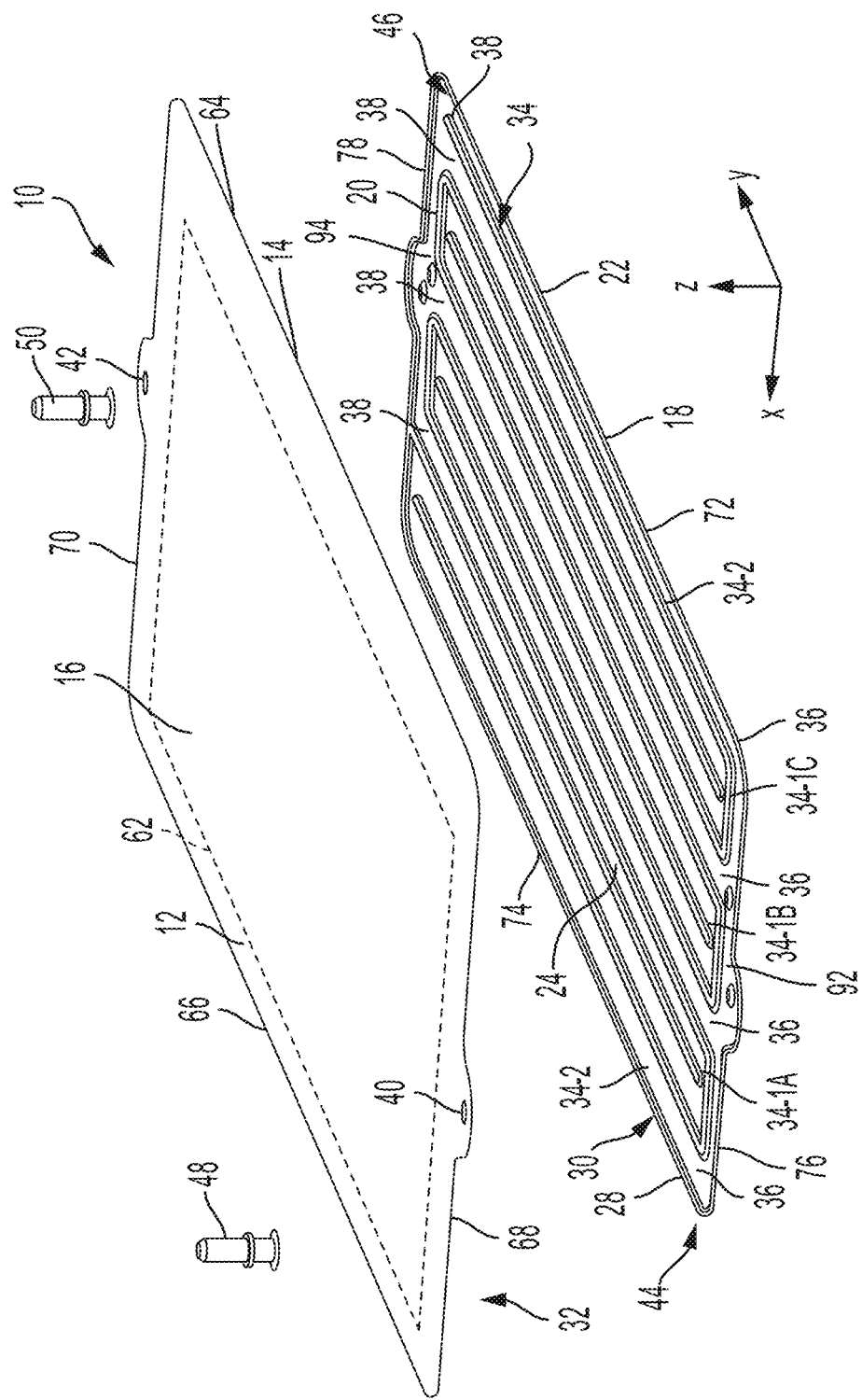
FIG. 3 is an exploded perspective view of the battery heat exchanger of FIG. 1.

As shown in FIG. 3, the first plate 12 is stacked above the second plate 18 along the z-axis and in contact when the heat exchanger 10 is assembled. For example, the inner surface 14 of the first plate 12 may directly contact the inner surface 20 of the second plate 18. The first plate 12 of heat exchanger 10 is flat and planar, having a pair of opposed, longitudinally-extending first and second side edges 64, 66 and a pair of opposed, transversely-extending first and second end edges 68, 70. The longitudinally-extending first and second side edges 64, 66 of the first plate 12 may be included in the first and second side edges 25, 26 of the heat exchanger 10 and the transversely-extending first and second end edges 68, 70 of the first plate 12 may be included in the first and second end edges 51, 52 of the heat exchanger 10. The first plate 12 may be substantially rectangular.

Figure 2:
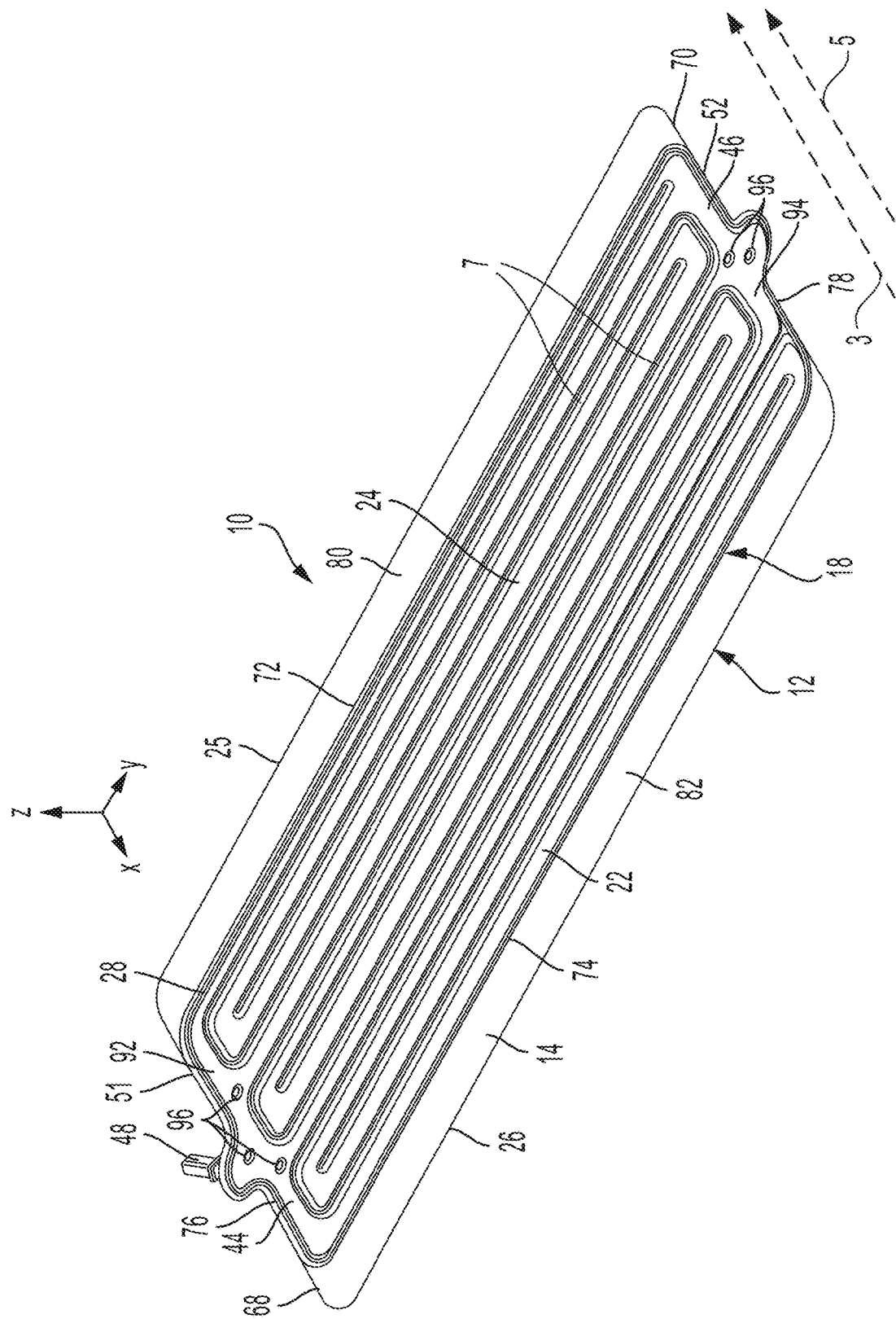
FIG. 2 is a bottom perspective view of the battery heat exchanger of FIG. 1.

The second plate 18 of heat exchanger 10 is shaped, for example by stamping, drawing or molding, to provide a plurality of embossments. The plurality of embossments define a central area 24 having a plurality of grooves or channels surrounded on all sides by a planar flange 28 defining a planar peripheral sealing surface 30 on the inner surface 20 of second plate 18. In one example, as shown in FIGS. 2, 3, and 5, the plurality of grooves form a serpentine pattern. The first and second plates 12, 18 are sealingly joined together with their inner surfaces 14, 20 in opposed facing relation to one another, and with portions of the inner surfaces 14, 20 being spaced apart from one another. The planar peripheral sealing surface 30 of second plate 18 is sealingly joined to a planar, peripheral sealing surface 32 on the inner surface 14 of first plate 12. The peripheral sealing surface 32 of the first plate 12 may reciprocate with the peripheral sealing surface 30 of the second plate 18, with portions of the inner surfaces 14, 20 inward, e.g., inside, of respective sealing surfaces 32, 30 being spaced apart from one another.

The second plate 18 also has a pair of opposed, longitudinally-extending first and second side edges 72, 74 which may be included in the first and second side edges 25, 26 of the heat exchanger 10. The second plate 18 also has a pair of opposed, transversely extending first and second end edges 76, 78 which may be included in the first and second end edges 51, 52 of the heat exchanger 10. The second plate 18 may be substantially rectangular.

In some embodiments, including all the embodiments disclosed herein, both the first and second plates 12, 18 may include a plurality of embossments defining a central area 24 having a plurality of grooves or channels surrounded on all sides by a planar flange 28 defining a planar peripheral sealing surface 30, wherein the peripheral sealing surfaces 30 of the two plates 12, 18 are sealingly joined together.

As shown in FIG. 2, a width 3 of the first plate 12 of heat exchanger 10 is greater than a width 5 of the second plate 18, such that the first and second side edges 64, 66 of the first plate 12 are spaced outwardly of the respective first and second side edges 72, 74 of the second plate 18. Also, in heat exchanger 10, the planar peripheral sealing surface 32 is located inwardly, e.g., inside, of the first and second side edges 64, 66 of first plate 12. Portions of the first plate 12 projecting beyond the side edges 72, 74 of the second plate 18 of define first and second outwardly projecting side portions 80, 82 of heat exchanger 10, in which the first plate 12 does not lie directly over any fluid flow passages of heat exchanger 10. A heat transfer surface area 62 of the heat exchanger 10, as shown in FIG. 1, may extend into these first and second outwardly projecting side portions 80, 82.

Although the first plate 12 is shown to be wider than the second plate 18, it is to be noted that the relative widths of the plates may vary in other examples. For example, the widths of the first and second plates 12, 18 (along the x axis) may be substantially the same.

At least some of the channels or grooves in the central area 24 of the second plate 18 may define bottoms, e.g., floors, and sides of fluid flow passages 34 having open first and second ends 36, 38, and which are further described below. The fluid flow passage 34 may be separated from one another and defined by ribs 7 protruding from the inner surface 20 of the second plate 18. Tops, e.g., ceilings, of the fluid flow passages 34 may be defined by the inner surface 14 of the first plate 12.

Heat exchanger 10 further comprises inlet and outlet ports 40, 42 forming apertures in the first plate 12. The inlet and outlet ports 40, 42 are located in the respective first and second end portions 44, 46 of heat exchanger 10, inward of the planar peripheral sealing surface 32 of the first plate 12, and proximate to the respective end edges 51, 52 of the heat exchanger 10. In the present embodiment, the end edges 51, 52 of the heat exchanger 10 (and the end edges 68, 70, 76, 78 of individual plates 12, 18) include outwardly bulging portions in which the inlet and outlet ports 40, 42 are located, thereby maximizing the heat transfer surface area 62.

The inlet port 40 is provided with a tubular inlet fitting 48 and the outlet port 42 is provided with a tubular outlet fitting 50, the fittings 48, 50 projecting upward from the outer surface 16 of the first plate 12, to provide flow communication between the fluid flow passages 34 and a fluid circulation system (not shown) of the vehicle. The ports 40, 42 and fittings 48, 50 are located outside of, and immediately adjacent to, the heat transfer surface area 62 of the outer surface 16 of the first plate 12 which is occupied by battery cells 2, as shown in FIG. 1.

The first and second plates 12, 18 and the fittings 48, 50 may be formed of aluminum or alloys thereof, and may be joined together by brazing in a brazing oven. Although the first and second plates 12, 18 are shown as having a same or similar thicknesses, as defined along the z-axis, the first plate 12 may comprise a heat sink or heat spreader having a thickness which is greater than that of the second plate 18 across at least a portion of its area, as further described below. However, increased temperature uniformity provided by the embodiments described herein may reduce a demand for a first plate 12 with the heat sink or heat spreader.

As the heat transfer fluid flows through the fluid flow passages 34, the fluid absorbs heat from the battery cells 2, and gradually becomes heated as the fluid flows from the inlet port 40 to the outlet port 42. This may result in temperature differences, as measured on the outer surface 16 of first plate 12 and/or the TIM, between the portions of the heat exchanger 10 in contact with cooler fluid entering through the inlet port 40, and portions of the heat exchanger 10 in contact with warmer fluid discharged through the outlet port 42. The temperature uniformity (Tmax−Tmin) of heat exchanger 10 may be defined by a magnitude of the temperature differences measured at different points on the outer surface 16 of first plate 12 and/or the TIM. To mitigate adverse effects of the temperature differences on battery cells 2, the temperature uniformity of heat exchanger 10 may be maintained within a predetermined range.

The fluid flow passages 34 of the heat exchanger 10 may include different types of fluid flow passages. For example, the fluid flow passages 34 includes at least one multipass fluid flow passage 34-1, each having a first end 36 and a second end 38. The first end 36 of each multipass fluid flow passage 34-1 is referred to herein as the "open inlet end", and is in flow communication with the inlet port 40. In other words, the multipass fluid flow passage 34-1 is fluidically coupled to the inlet port 40. Similarly, the second end 38 of each multipass fluid flow passage 34-1 is referred to herein as the "open outlet end", and is in flow communication with the outlet port 42. As such, the multipass fluid flow passage 34-1 is also fluidically coupled to the outlet port 42. Also, in the present embodiment, the open inlet end 36 of each multipass fluid flow passage 34-1 is located in the first end portion 44 of the heat exchanger 10, and the open outlet end 38 of each multipass fluid flow passage 34-1 is located in the second end portion 46 of the heat exchanger 10.

Each multipass fluid flow passage 34-1 comprises at least three parallel, longitudinally-extending legs. For example, as shown in FIG. 4, each multipass fluid flow passage 34-1 includes an inlet leg 84 including the open inlet end 36; an outlet leg 86 including the open outlet end 38; and at least one intermediate leg 88 located between the inlet leg 84 and the outlet leg 86. As the heat transfer fluid moves through each multipass fluid flow passage 34-1, the fluid absorbs heat from the battery cells 2, and therefore a temperature of the fluid gradually increases as the fluid flows from the inlet end 36 to the outlet end 38. Therefore, the average temperature of the heat transfer fluid is lowest in the inlet leg 84, due to proximity to the inlet port 40, and is highest in the outlet leg 86, due to proximity to the outlet port 42. The average temperature in the intermediate leg 88 is between the average temperatures in the inlet leg 84 and the outlet leg 86.

In the heat exchanger 10, the three legs 84, 86, 88 of each heat exchanger are straight and parallel to each other and to the longitudinal axis. Also, the legs 84, 86, 88 may be of substantially the same length and width, and the legs of each multipass fluid flow passage 34-1 are joined together at their ends by bends 90, as shown in FIG. 5. For example, as depicted in FIG. 5, in each multipass fluid flow passage 34-1, the inlet leg 84 is joined to intermediate leg 88 by one of the bends 90 located toward the second end portion 46 of the heat exchanger 10, and the intermediate leg 88 is joined to the outlet leg 86 by one of the bends 90 located toward the first end portion 44 of heat exchanger 10. In embodiments where there are multiple intermediate legs, e.g., more than one of intermediate leg 88 in each multipass fluid flow passage 34-1, the legs may be similarly be joined together by bends 90. In the illustrated embodiment, each bend 90 is a 180-degree hairpin bend.

In the embodiment of FIGS. 1-5, three multipass fluid flow passages 34-1 are shown, which are labeled as 34-1A, 34-1B and 34-1C and referred to herein as the first, second and third multipass fluid flow passages, respectively. However, it will be appreciated that other examples of heat exchangers may instead have one, two or more than three multipass fluid flow passages 34-1. Also, in the present embodiment, each multipass fluid flow passage 34-1 has three legs, namely one inlet leg 84, one outlet leg 86 and one intermediate leg 88, however, in other examples, each multipass fluid flow passage 34-1 may instead have a total of five legs, including three intermediate legs 88, or a total of seven legs, including five intermediate legs, etc.

As shown in the top view of the second plate 18 in FIG. 5, the inlet leg 84 of the first multipass fluid flow passage 34-1A extends along the first side edge 72 of the second plate 18, so as to produce a relatively low temperature along the first side edge 72 of second plate 18, and also reducing the temperature along the first side edge 25 of the heat exchanger 10.

In the present embodiment, it can be seen that the multipass fluid flow passages 34-1A, 34-1B and 34-1C are arranged such that the outlet leg 86 of the first multipass fluid flow passage 34-1A is located adjacent to the inlet leg 84 of the second multipass fluid flow passage 34-1B. Similarly, the outlet leg 86 of the second multipass fluid flow passage 34-1B is located adjacent to the inlet leg 84 of the third multipass fluid flow passage 34-1C. This arrangement places fluid flow passages carrying relatively hot fluid (i.e. outlet legs 86) directly adjacent to fluid flow passages carrying relatively cold fluid (i.e. inlet legs 84). With this arrangement, heat energy may be transferred by conduction from the relatively hot fluid flowing through the outlet leg 86 of one multipass fluid flow passage 34-1 to the relatively cold fluid flowing through the inlet leg 84 of an adjacent multipass fluid flow passage 34-1, wherein the heat energy is conducted through the plates 12, 18. This conductive heat transfer assists in increasing temperature uniformity throughout heat exchanger 10.

With the arrangement of the multipass fluid flow passages 34-1 of heat exchanger 10, relatively cold fluid may flow along the second side edge 74 of the second plate 18 through the inlet leg 84 of the first multipass fluid flow passage 34-1A. However, the outlet leg 86 of the third multipass fluid flow passage 34-1C is proximate to the first side edge 72 of the second plate 18, where the outlet leg 86 may carry relatively hot fluid. In order to provide a reduced temperature along the first side edge 72 of second plate 18 and the first side edge 25 of the heat exchanger 10, the heat exchanger 10 includes a further fluid flow passage 34 for relatively cold fluid along the first side edge 72 of second plate 18 and, more specifically, between the outlet leg 86 of the third multipass fluid flow passage 34-1C and the first side edge 72 of the second plate 18.

The further flow passage is identified by reference character 34-2, and has a single-pass fluid flow passage with an open inlet end 36 in flow communication with the inlet port 40, and an open outlet end 38 in flow communication with the outlet port 42. As discussed above, the placement of a fluid flow passage carrying relatively hot fluid (i.e. outlet leg 86 of passage 34-1C) directly adjacent to a fluid flow passage carrying relatively cold fluid (i.e. single-pass fluid flow passage 34-2) results in conduction of heat energy from outlet leg 86 of passage 34-1C to the relatively cold fluid flowing through the single-pass fluid flow passage 34-2 such that the heat energy is conducted through the plates 12, 18.

The heat exchanger 10 further comprises an internal inlet manifold space 92 in the first end portion 44 of the heat exchanger 10, wherein the inlet manifold space 92 is in flow communication with the inlet port 40 and with each of the fluid flow passages 34 (i.e. including passages 34-1 and 34-2). More specifically, the inlet manifold space 92 is in flow communication with the open inlet end 36 of each fluid flow passage 34. Therefore, cold heat transfer fluid enters the heat exchanger 10 through inlet port 40 and is distributed across the width, defined along the x-axis, of the inlet manifold space 92 before entering the inlet ends 36 of the fluid flow passages 34.

Similarly, heat exchanger 10 comprises an internal outlet manifold space 94 in the second end portion 46 of heat exchanger 10, wherein the outlet manifold space 94 is in flow communication with the outlet port 42 and with each of the fluid flow passages 34 (i.e. including passages 34-1 and 34-2). More specifically, the outlet manifold space 94 is in flow communication with the open outlet end 38 of each fluid flow passage 34. Therefore, heated fluid exiting the fluid flow passages 34 is collected in the outlet manifold space 94 before being discharged through the outlet port 42.

The heat exchanger 10 may include a plurality of support dimples 96 in areas of the heat exchanger 10 in which the inner surfaces 14, 20 of the first and second plates 12, 18, respectively, are spaced apart from one another. The dimples 96 may protrude upwards, with respect to the z-axis, from the inner surface 20 of the second plate 18. As shown in FIG. 5, the dimples 96 are provided proximate to the inlet and outlet ports 40, 42 and/or the inlet and outlet manifold spaces 92, 94. The dimples 96 may have flat or rounded top surfaces which are co-planar with the other raised portions of the second plate 18, including planar flange 28 and the ribs 7 defining the fluid flow passages 34, with the top surfaces of dimples 96 being sealingly joined to the inner surface 14 of first plate 12. In addition to providing support, the dimples 96 may moderate a flow distribution through the inlet manifold space 92 and the outlet manifold space 94.

Although the inlet and outlet ports 40, 42 are shown in FIG. 3 to be located in a central region of each of the first and second end edges 68, 70 of first plate 12 (e.g. along a central longitudinal axis of heat exchanger 10 parallel with the y-axis), it will be appreciated that, in other examples, the inlet and outlet ports 40, 42 may be located anywhere along the first and second end edges 68, 70, so long as the inlet and outlet ports 40, 42 are in fluid communication with the respective inlet and outlet manifold spaces 92, 94. Therefore, in some embodiments, the inlet and outlet ports 40, 42 may be located proximate to directly opposite corners, or diagonally opposite corners, of first plate 12. Also, it will be appreciated that the outwardly bulging portions of the first and second plates 12, 18 in which the inlet and outlet ports 40, 42 are located, are optional features which are not required in all embodiments.

FIG. 6 illustrates a fluid temperature distribution throughout the fluid flow passages 34 of heat exchanger 10, with a cooler fluid temperature of, for example, 20° C. at the inlet port 40 and a warmer fluid temperature of, for example, 28.1° C. at the outlet port 42. Each outlet leg 86 of each multipass fluid flow channel 34 has a higher temperature than each inlet leg 84. Each intermediate leg 88 of each multipass fluid flow channel 34 is warmer than an adjacent inlet leg 84 but cooler than an adjacent outlet leg 86. Heat transfer fluid flowing through the fluid flow passages 34 become warmer as the fluid travels through the legs of the fluid flow passages 34, absorbing heat from battery cells, e.g., the battery cells 2 of FIG. 1, coupled to the heat exchanger 10.

A heat exchanger 100 according to a second embodiment is illustrated in FIG. 7. Heat exchanger 100 shares a number of like elements with heat exchanger 10 and these like elements will not be re-introduced for brevity.

Heat exchanger 100 is a cold plate and comprises a first plate 700 and a second plate 702. An outer surface 704 of the first plate 700 provides a flat surface upon which one or more battery cells and/or battery modules (not shown) may be supported.

The first plate 700 of heat exchanger 100 is flat and planar, and is substantially rectangular. The second plate 702 is shaped with a plurality of embossments which together define a central area 706 having a plurality of grooves or channels surrounded on all sides by a planar flange 708 defining a planar peripheral sealing surface 710 on an inner surface 712 of second plate 702. The first and second plates 700, 702 are sealingly joined together with an inner surface 714 of the first plate 700 in opposed facing relation with the inner surface 712 of the second plate 702, and with portions of the inner surfaces 714, 712 being spaced apart from one another.

The central area 706 include the plurality of grooves or channels forming a serpentine pattern across the central area 706, each grove extending parallel with the y-axis. The central area 706 also include a gap 707 between the plurality of grooves in a central region of the central area 706. The plurality of grooves on one side of the gap 707 may be continuous with the plurality of grooves on an opposite side of the gap 707. The gap 707 may be configured to interface with a space between battery cells of the battery module coupled to heat exchanger 100. The purpose for the gap is to accommodate mounting features or other external items (e.g. electrical cables, coolant lines, etc.) to pass through the heat exchanger, or to simply allow for no coolant flow to an area that is NOT underneath a battery module (i.e. if a plate is cooling more than one battery module, and they are separated by some distance, we would have a gap between the active cooling areas).

The heat exchanger 100 and its plates 700, 702 are rectangular, and elongated along transverse axis x, and shortened along longitudinal axis y. The first and second plates 700, 702 of heat exchanger 100 are of substantially the same width (along the x-axis).

First and second fluid ports 716, 718 are provided in the first plate 700, and are located, respectively, in a first end portion 720 and a second end portion 722 of the first plate

700. In the present embodiment, the first and second fluid ports 716, 718 are located proximate to opposed corners of the first plate 700, rather than at the midway point of end edges 751, 752, as in heat exchanger 10. The ports 716, 718 may be provided with tubular fittings, such as the tubular fittings 48, 50 shown in FIG. 3. In the present embodiment either port 716, 718 may be the inlet or outlet. For the purpose of illustration, however, first fluid port 716 will be assumed to be the inlet port and second fluid port 718 will be assumed to be the outlet port.

Heat exchanger 100 includes a total of eight multipass fluid flow passages 134, which may be similar to the multipass fluid flow passages 34 of FIGS. 3-6. The multipass fluid flow passages are individually labeled as 134-1 to 134-8 in the drawings, each having first and second open ends 136, 138. Depending on the overall direction of fluid flow through heat exchanger 100, either open end 136, 138 may be the inlet end or the outlet end. For the purpose of illustration, the first open end 136 of each multipass fluid flow passage 134 is referred to herein as the "open inlet end", and is in flow communication with the inlet port 716. Similarly, the second end 138 of each multipass fluid flow passage 134 is referred to herein as the "open outlet end", and is in flow communication with the outlet port 718. Also, the open inlet end 136 of each multipass fluid flow passage 134 is located in the first end portion 720 of heat exchanger 100, and the open outlet end 138 is located in the second end portion 722.

Each multipass fluid flow passage 134 comprises three longitudinally-extending legs, namely inlet leg 184 including the open inlet end 136; outlet leg 186 including the open outlet end 138; and one intermediate leg 188 located between the inlet and outlet legs 184, 186. Similar to heat exchanger 10, the average temperature of the heat transfer fluid is lowest in the inlet leg 184, due to proximity to the inlet port 716, and is highest in the outlet leg 186, due to proximity to the outlet port 718. The average temperature in the intermediate leg 188 is between the average temperatures in the inlet leg 184 and the outlet leg 186.

As in heat exchanger 10, the three legs 184, 186, 188 of each multipass fluid flow passage 134 in heat exchanger 100 are straight and parallel to each other and to the longitudinal axis. Also, the legs 184, 186, 188 may be of substantially the same length and width, and the legs of each multipass fluid flow passage 134 are joined together at their ends by 180-degree hairpin bends 790.

The inlet leg 184 of the first multipass fluid flow passage 134-1 extends along a first side edge 724 of second plate 702, so as to produce a relatively low temperature along the first side edge 724 of second plate 702, and also reducing the temperature along a first side edge 726 of the heat exchanger 100.

The multipass fluid flow passages 134-1 to 134-8 are arranged as in heat exchanger 100, with the outlet leg 186 of each multipass fluid flow passage 134-1 to 134-7 being located adjacent to the inlet leg 184 of an second multipass fluid flow passage 134, so as to promote conduction from the outlet leg 186 of one passage 134 to the inlet leg 184 of an adjacent passage 134.

It can be seen that the outlet leg 186 of the multipass fluid flow passage 134-8 is proximate to a second side edge 728 of the second plate 702, wherein the outlet leg 186 will carry relatively hot fluid. In order to reduce the temperature along the second side edge 728, heat exchanger 100 may include a single-pass fluid flow passage between the outlet leg 186 of the multipass fluid flow passage 134-8 and the second side edge 728 of the second plate 702. However, such a single-pass fluid flow passage, being similar to passage 34-2 of heat exchanger 10, is optional and is not shown in FIG. 7.

Heat exchanger 100 further comprises an internal inlet manifold space 730 in the first end portion 720 of heat exchanger 100, wherein the inlet manifold space 730 is in flow communication with the inlet port 716 and with the open inlet end 36 of each multipass fluid flow passage 134. Cold heat transfer fluid enters heat exchanger 100 through inlet port 716 and is distributed across the width of the inlet manifold space 730 before entering the inlet ends 136 of the fluid flow passages 134.

Similarly, heat exchanger 100 comprises an internal outlet manifold space 732 in the second end portion 722, which is in flow communication with the outlet port 718 and with the open outlet end 138 of each fluid flow passage 134. Heated fluid exiting the fluid flow passages 134 is collected in the outlet manifold space 732 before being discharged through the outlet port 718.

The internal inlet and outlet manifold spaces 730, 732 of heat exchanger 100 may be narrower than corresponding spaces 730, 732 in heat exchanger 10, and may include narrow channels extending along end edges 734, 736 of second plate 702. Due to their narrowness, the inclusion of support dimples in manifold spaces 730, 732 may not be demanded in the present embodiment.

Also, the inlet and outlet manifold spaces 730, 732 may include respective extensions 738, 740 protruding along the x-axis beyond the area of second plate 702 in which the fluid flow passages 134 are defined. The extension portions 738, 740 provide fluid communication between the inlet and outlet manifold spaces 730, 732 and the inlet and outlet ports 716, 718 located in the opposed corners of the first plate 700.

Due to its proximity to the inlet port 716, which receives cold heat transfer fluid, the internal inlet manifold space 730 may be at a lower temperature than other areas of the heat exchanger 100. Similarly, the internal outlet manifold space 732 may be at a higher temperature than other areas of heat exchanger 100 due to proximity to the outlet port 718, through which hot fluid is discharged from heat exchanger 100. The presence of these hot and cold areas within a heat transfer surface area 762 of the heat exchanger 100 may reduce temperature uniformity within the heat exchanger 100 and/or within battery cells or modules which are supported on the heat transfer surface area 762. This issue may be addressed by adjusting the heat transfer surface area 762 such that it does not include the portions of first plate 12 which are located directly over the internal inlet and outlet manifold spaces 730, 732. For example, where permitted by packaging requirements, the heat exchanger 100 may be elongated along the y-axis such that the internal inlet and outlet manifold spaces 730, 732 lie outside the heat transfer surface area 762. With this configuration, the heat transfer surface area 762 may only include areas which form part of the fluid flow passages 134.

Figure 8:
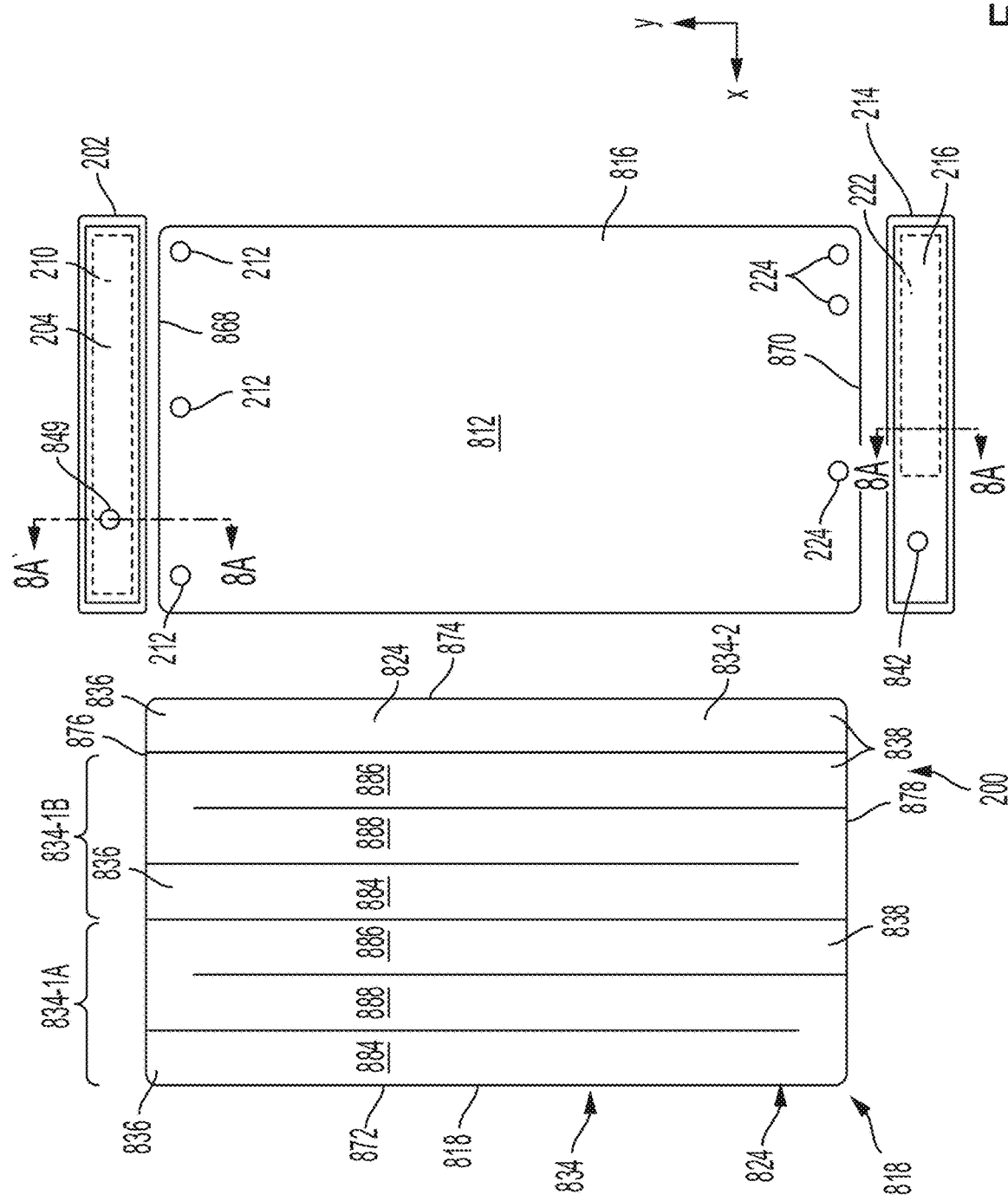
FIG. 8 is a disassembled top plan view of a heat exchanger according to a third embodiment.

In other embodiments, a likelihood of the aforementioned adverse impacts on temperature uniformity may be circumvented by removing the internal inlet and outlet manifold spaces 730, 732 altogether. FIG. 8 schematically illustrates a heat exchanger 200 which does not include internal inlet and outlet manifold spaces but rather includes external manifolds similar to those of a counterflow heat exchanger, as described below. A first plate 812 and a second plate 818 of heat exchanger 200 are depicted separate from one another in FIG. 8. Cross-sections of the external manifolds of heat exchanger 200 are shown in FIGS. 9 and 10. Heat exchanger 200 shares a number of similar elements with heat exchangers 10 and 100, and will not be re-introduced for brevity.

FIG. 8 schematically shows a bottom plate 818 of heat exchanger 200, on the left side of FIG. 8, as having two multipass fluid flow passages 834-1A and 834-1B and one single-pass fluid flow passage 834-2, similar to the single-pass fluid flow passage 34-2 of FIGS. 3-5 wherein fluid flow passages 834 of heat exchanger 200 have the same overall arrangement as in heat exchanger 10. As such, the fluid flow passages 834 are arranged such that the single-pass fluid flow passage 834-2 and an inlet leg 884 of first multipass fluid flow passage 834-1A are located adjacent to side edges 872, 874 of second plate 818; an outlet leg 886 of first multipass fluid flow passage 834-1A is adjacent to an inlet leg 884 of the second multipass fluid flow passage 834-1B; and an outlet leg 886 of second multipass fluid flow passage 834-1B is adjacent to the single-pass fluid flow passage 834-2. Although not shown in FIG. 8, the second plate 818 may include a peripheral flange with a planar sealing surface surrounding a central area 824 of the second plate 818.

In heat exchanger 200, the fluid flow passages 834-1 and 834-2 extend to the edges of the central area 824, proximate to end edges 876, 878 of second plate 818, thereby precluding any internal inlet and outlet manifold spaces. Instead, the heat exchanger 200 is provided with a pair of external manifolds, comprising inlet manifold 202 and outlet manifold 214. External inlet manifold 202 is adjacent to a first edge 868 of the first plate 812 and external outlet manifold 214 is adjacent to a second edge 870 of the first plate 812. A first cross-section 900 of the external inlet manifold 202 is shown in FIG. 9, taken along line 8A-8A' of FIG. 8.

Turning now to FIG. 9, the external inlet manifold 202 has an upper side 204 in which the inlet port 840 is provided, and a lower side 206 which is in direct communication with the open inlet end 836 of each of the fluid flow passages 834-1 and 834-2, and sealingly joined to an outer surface 816 of the first plate 812, as shown in FIG. 8. The external inlet manifold 202 also includes an internal manifold space 208 which distributes the incoming cold heat transfer fluid to each of the fluid flow passages 834-1 and 834-2. To provide fluid communication between the lower side 206 and the open inlet end 836 of each fluid flow passage 834-1, 834-2, the lower side 206 is provided with one or more apertures 210 which is/are aligned with a plurality of inlet apertures 212 in the first plate 812, as shown in FIG. 8, each of the inlet apertures 212 being provided directly over the open inlet end 836 of each of the fluid flow passages 834-1 and 834-2. It will be appreciated that the one or more apertures 210 may be in the form of a single opening or slot which overlies all the inlet apertures 212 of first plate 812, or it may include a plurality of apertures 210, each of which is in flow communication with one or more inlet apertures 212.

The external outlet manifold 214 is shown in a second cross-section 1000 in FIG. 10, taken along line 8B-8B' of FIG. 8. The external outlet manifold 214 is similarly configured to the external inlet manifold 202, having an upper side 216 in which the outlet port 842 is provided, and a lower side 218 which is in direct communication with the open outlet end 838 of each of the fluid flow passages 834-1 and 834-2 of FIG. 8, and which is sealingly joined to the outer surface 816 of the first plate 812. The external outlet manifold 214 also includes an external manifold space 220 which collects the hot heat transfer fluid discharged from each of the fluid flow passages 834-1 and 834-2. To provide fluid communication between the lower side 218 and the open outlet end 838 of each fluid flow passage 834-1, 834-2, the lower side 218 is provided with one or more apertures 222 which is/are aligned with a plurality of outlet apertures 224 in the first plate 812, as shown in FIG. 8, each of the outlet apertures 224 being provided directly over the open outlet end 838 of the fluid flow passage 834-1 or 834-2. It will be appreciated that the one or more apertures 222 may be in the form of a single opening or slot which overlies all the outlet apertures 224 of first plate 812, or it may include a plurality of apertures 222, each of which is in flow communication with one or more outlet apertures 224.

Figure 11:
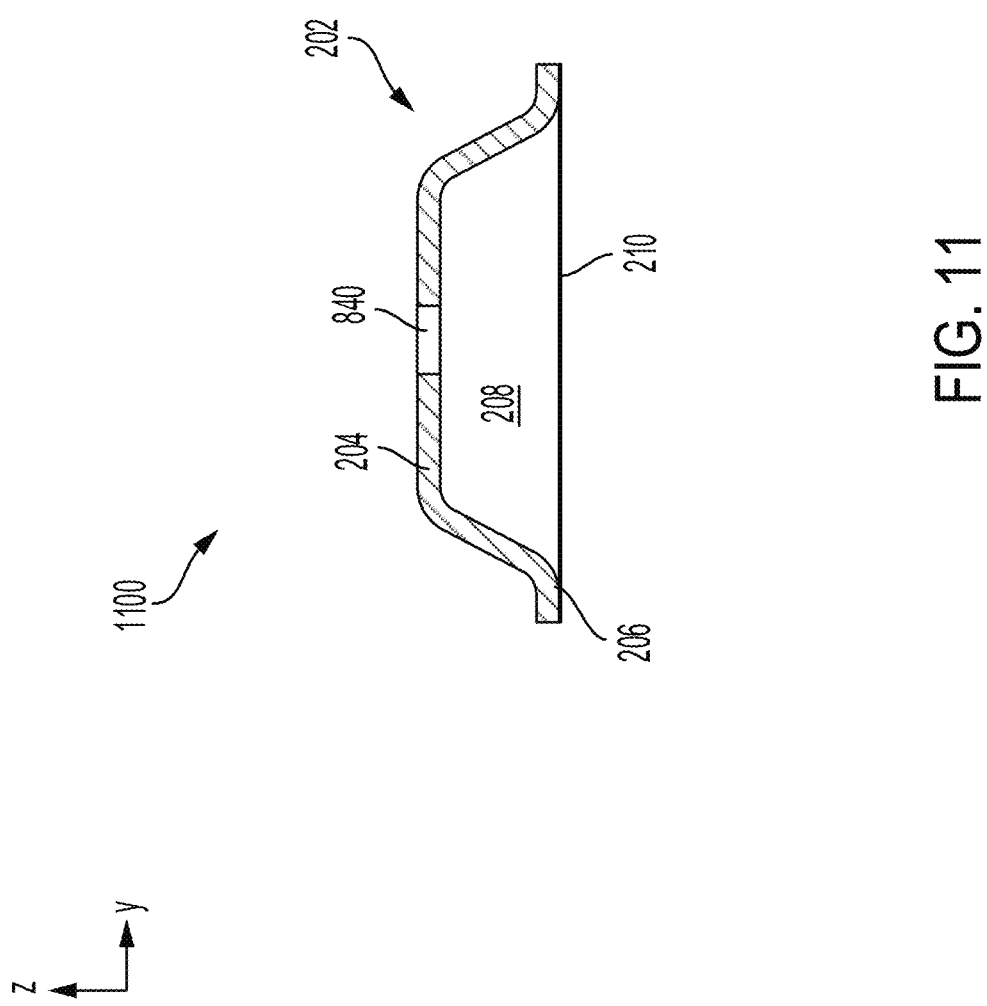
FIG. 11 is an alternate example of the first cross-section of FIG. 9.

In the illustrated embodiment, each of the external inlet and outlet manifolds 202, 214 comprises a pair of embossed plates having peripheral flanges which are joined together, as shown in the first cross-section of FIG. 9 and the second cross-section of FIG. 10. However, as shown in FIG. 11 in a third cross-section 1100, either or both of the external inlet and outlet manifolds 202, 214 may instead comprise a single embossed plate having a peripheral flange which is sealingly joined to outer surface 816 of first plate 812. The third cross-section 1100 is depicted as an alternate example of the external inlet manifold 202 but may be similarly configured as an alternate example of the external outlet manifold 214.

Although the heat exchangers described herein are cold plates, it will be appreciated that ICE plate heat exchangers are also within the scope of the present disclosure. In this regard, an ICE plate heat exchanger may be constructed from two mirror image shaped plates similar or identical to second plates 18 described above, and optionally having "side-entry" inlet and outlet fittings projecting from one of the edges of the heat exchanger.

In this way, heat generated by vehicle batteries may be dissipated by a heat exchanger configured with a first plate and a second plate, the first and second plate in in face-sharing contact, e.g., opposing face relation, and defining a plurality of fluid flow passages allowing heat to be transferred from the vehicle batteries to a heat transfer fluid. The plurality of fluid flow passages may be coupled at one end to an inlet and at an opposite end to an outlet of the heat exchanger. The plurality of fluid flow passages may form a serpentine pattern and may each include at least three longitudinally-extending legs. The heat exchanger described herein may provide enhanced temperature uniformity across the heat exchanger, thereby increasing a cooling efficiency of the heat exchanger.

FIGS. 1-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a heat exchanger includes a first end and a second end spaced apart along a longitudinal axis; and a first side edge and a second side edge extending between the first and second ends, a first plate having an inner surface, an outer surface, a pair of opposed, longitudinally-extending first and second side edges and a pair of opposed, transversely-extending first and second end edges, a second plate having an inner surface, an outer surface, a pair of opposed, longitudinally-extending first and second side edges and a pair of opposed, transversely-extending first and second end edges, wherein the first and second plates are joined together with their inner surfaces in opposed facing relation to one another, and with portions of the inner surfaces being spaced apart from one another, a plurality of fluid flow passages adapted for flow of a heat transfer fluid, and located between the spaced apart portions of the inner surfaces of the first and second plates, an inlet port at the first end of the heat exchanger for supplying the heat transfer fluid to the plurality of fluid flow passages, and an outlet port at the second end of the heat exchanger for discharging the heat transfer fluid from the plurality of fluid flow passages, wherein the plurality of fluid flow passages comprises, at least one multipass fluid flow passage having an open inlet end in flow communication with the inlet port, and an open outlet end in flow communication with the outlet port, the multipass fluid flow passage having at least three longitudinally-extending legs. In a first example of the heat exchanger, the at least three longitudinally-extending legs are parallel to one another. A second example of the heat exchanger optionally includes the first example, and further includes, wherein the at least three longitudinally-extending legs each have an inlet leg which includes the inlet end of the multipass fluid flow passage, an outlet leg which includes the outlet end of the multipass fluid flow passage, and at least one intermediate leg located between the inlet leg and the outlet leg. A third example of the heat exchanger optionally includes one or more of the first and second examples, and further includes, wherein the inlet leg of one multipass fluid flow passage of the at least one multipass fluid flow passage extends along the first side edge of the second plate. A fourth example of the heat exchanger optionally includes one or more of the first through third examples, and further includes, wherein the plurality of fluid flow passages includes a plurality of multipass fluid flow passages, with a first multipass fluid flow passage adjacent to a second multipass fluid flow passage and wherein an outlet leg of the first multipass fluid flow passage is adjacent to an inlet leg of the second multipass fluid flow passage. A fifth example of the heat exchanger optionally includes one or more of the first through fourth examples, and further includes, wherein the plurality of fluid flow passages further includes a single-pass fluid flow passage extending along the second side edge of the second plate, wherein the single-pass fluid flow passage has an open inlet end in flow communication with the inlet port, and an open outlet end in flow communication with the outlet port. A sixth example of the heat exchanger optionally includes one or more of the first through fifth examples, and further includes, wherein the single-pass fluid flow passage is located between and parallel to the second side edge of the second plate and the outlet leg of one of the plurality of multipass fluid flow passages. A seventh example of the heat exchanger optionally includes one or more of the first through sixth example, and further includes an internal inlet manifold space proximate to the first end of the heat exchanger and an internal outlet manifold space proximate to the second end of the heat exchanger and wherein the internal inlet manifold space is in flow communication with the inlet port and with each fluid flow passage of the plurality of fluid flow passages and the internal outlet manifold space is in flow communication with the outlet port and with each fluid flow passage of the plurality of fluid flow passages. An eighth example of the heat exchanger optionally includes one or more of the first through seventh examples, and optionally includes, wherein the internal inlet manifold space is in flow communication with the open inlet end of the at least one multipass fluid flow passage; and the internal outlet manifold space is in flow communication with the open outlet end of the at least one multipass fluid flow passage.

In another embodiment, a heat exchanger includes an inlet port at a first end of the heat exchanger, an outlet port, arranged at a second, opposite side of the heat exchanger from the inlet port, a first plate configured to interface with the battery module and a second plate shaped with embossments, the first plate and second plate stacked together to form a plurality of fluid flow passages extending along a longitudinal axis of the heat exchanger, each of the plurality of fluid flow passages having an inlet end fluidically coupled to the inlet port and an outlet end fluidically coupled to the outlet port. In a first example of the heat exchanger, the plurality of fluid flow passages includes at least one multipass fluid flow passage having an inlet leg, at least one intermediate leg, and an outlet leg, the legs substantially straight and parallel to one another and extending along a longitudinal axis of the heat exchanger. A second example of the heat exchanger optionally includes the first example, and further includes, wherein the inlet leg and the outlet leg are each joined to the at least one intermediate leg by a bend and wherein the bend is a rounded hairpin bend located proximate to one of the first end and the second end of the heat exchanger. A third example of the heat exchanger optionally includes one or more of the first and second examples, and further includes, wherein the inlet port and the outlet port are formed in the first plate and wherein the inlet port is provided with an inlet fitting and the outlet port is provided with an outlet fitting. A fourth example of the heat exchanger optionally includes one or more of the first through third examples, and further includes, wherein the first plate is wider than the second plate in a direction parallel to a transverse axis of the heat exchanger and wherein the first plate includes first and second outwardly projecting side portions extending parallel to a longitudinal axis of the heat exchanger along side edges of the heat exchanger. A fifth example of the heat exchanger optionally includes one or more of the first through fourth examples, and further includes, wherein the plurality of fluid flow passages form a serpentine pattern. A sixth example of the heat exchanger optionally includes one or more of the first through fifth examples, and further includes a planar flange surrounding a central area of the heat exchanger, the central area formed of the plurality of fluid flow passages, and wherein the planar flange defines a planar peripheral sealing surface along an inner surface of the second plate.

In yet another embodiment, a system includes a battery module, including at least one battery cell, a set of plates forming a heat exchanger including a first plate directly in contact with the battery module and a second plate arranged below the first plate and spaced away from the battery module by the first plate, a plurality of fluid flow passages, including a plurality of multipass fluid flow passages, in fluid communication with an inlet port and an outlet port of the heat exchanger and formed in spaces between the first plate and the second plate, and an inlet manifold arranged at a first end of the battery heat exchanger and in fluid communication with the inlet port and an outlet manifold arranged at a second, opposite end of the battery heat exchanger and in fluid communication with the outlet port. In a first example of the system, the inlet manifold is arranged external to the set of plates, the inlet manifold having an upper side in which the inlet port is provided and a lower side which is in direct communication with an open inlet end of each of the plurality of fluid flow passages and sealingly joined to an outer surface of the first plate. A second example of the system optionally includes the first example, and further includes, wherein the outlet manifold is arranged external to the set of plates, the outlet manifold having an upper side in which the outlet port is provided, and a lower side which is in direct communication with an open outlet end of each of the plurality of fluid flow passages, and which is sealing joined to an outer surface of the first plate. A third example of the system optionally includes one or more of the first and second examples, and further includes, wherein a lower side of the inlet manifold is provided with one or more apertures aligned with a plurality of inlet apertures in the first plate, each of the inlet apertures of the first plate being provided directly over the open inlet end of at least one of the plurality of fluid flow passages and wherein a lower side of the outlet manifold is provided with one or more apertures aligned with a plurality of outlet apertures in the first plate, each of the outlet apertures of the first plate being provided directly over the open outlet end of at least one of the plurality of fluid flow passages.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A heat exchanger for a battery module, comprising:
an inlet port and an inlet manifold at a first end along a longitudinal axis of the heat exchanger;
an outlet port and an outlet manifold arranged at a second, opposite side along the longitudinal axis of the heat exchanger from the inlet port;
a first plate configured to interface with the battery module and a second plate shaped with embossments, the first plate and second plate stacked together to form a plurality of fluid flow passages extending along the longitudinal axis of the heat exchanger, each of the plurality of fluid flow passages having an inlet end fluidically coupled to the inlet port and an outlet end fluidically coupled to the outlet port;
the plurality of fluid flow passages comprising:
at least two multipass fluid flow passages comprising:
an inlet leg extending from the inlet manifold to a first connection adjacent to the outlet manifold;
an intermediate leg extending from the first connection to a second connection adjacent to the inlet manifold; and
an outlet leg extending from the second connection to the outlet manifold, and at least one outlet leg formed between a first rib and a second rib, the first rib separating the at least one outlet leg and one of the intermediate legs, and the second rib separating the at least one outlet leg and one of the inlet legs.

2. The heat exchanger of claim 1, wherein the legs of the at least two multipass fluid flow passages are substantially straight and parallel to one another and extending along the longitudinal axis of the heat exchanger.

3. The heat exchanger of claim 2, wherein the first connection and second connections are bends formed as a rounded hairpin bend.

4. The heat exchanger of claim 1, wherein the first plate is wider than the second plate in a direction parallel to a transverse axis of the heat exchanger and wherein the first plate includes first and second outwardly projecting side portions extending parallel to the longitudinal axis of the heat exchanger along side edges of the heat exchanger.

5. The heat exchanger of claim 1, wherein at least one inlet leg is positioned adjacent to at least one outlet leg.

6. The heat exchanger of claim 1, wherein the fluid flow passages further comprise a single-pass fluid flow passage which extends directly from the inlet manifold to the outlet manifold, and
the single-pass fluid flow passage is positioned adjacent to the outlet leg.

7. The heat exchanger of claim 6, wherein heat is transferred to fluid of the single-pass fluid flow passage from the adjacent outlet leg.

8. The heat exchanger of claim 1, wherein fluid of the intermediate leg is warmer than the fluid of the inlet leg and fluid of the outlet leg is warmer than the fluid of the intermediate leg.

* * * * *